3,266,342
METHOD OF FORMING ROLLER CONE CUTTER
John B. Coulter, Jr., and James B. Steen, Fort Worth, Tex., assignors to Chicago Pneumatic Tool Company, New York, N.Y., a corporation of New Jersey
Original application Oct. 26, 1962, Ser. No. 233,219, now Patent No. 3,223,188, dated Dec. 14, 1965. Divided and this application Mar. 16, 1965, Ser. No. 440,206
7 Claims. (Cl. 76—108)

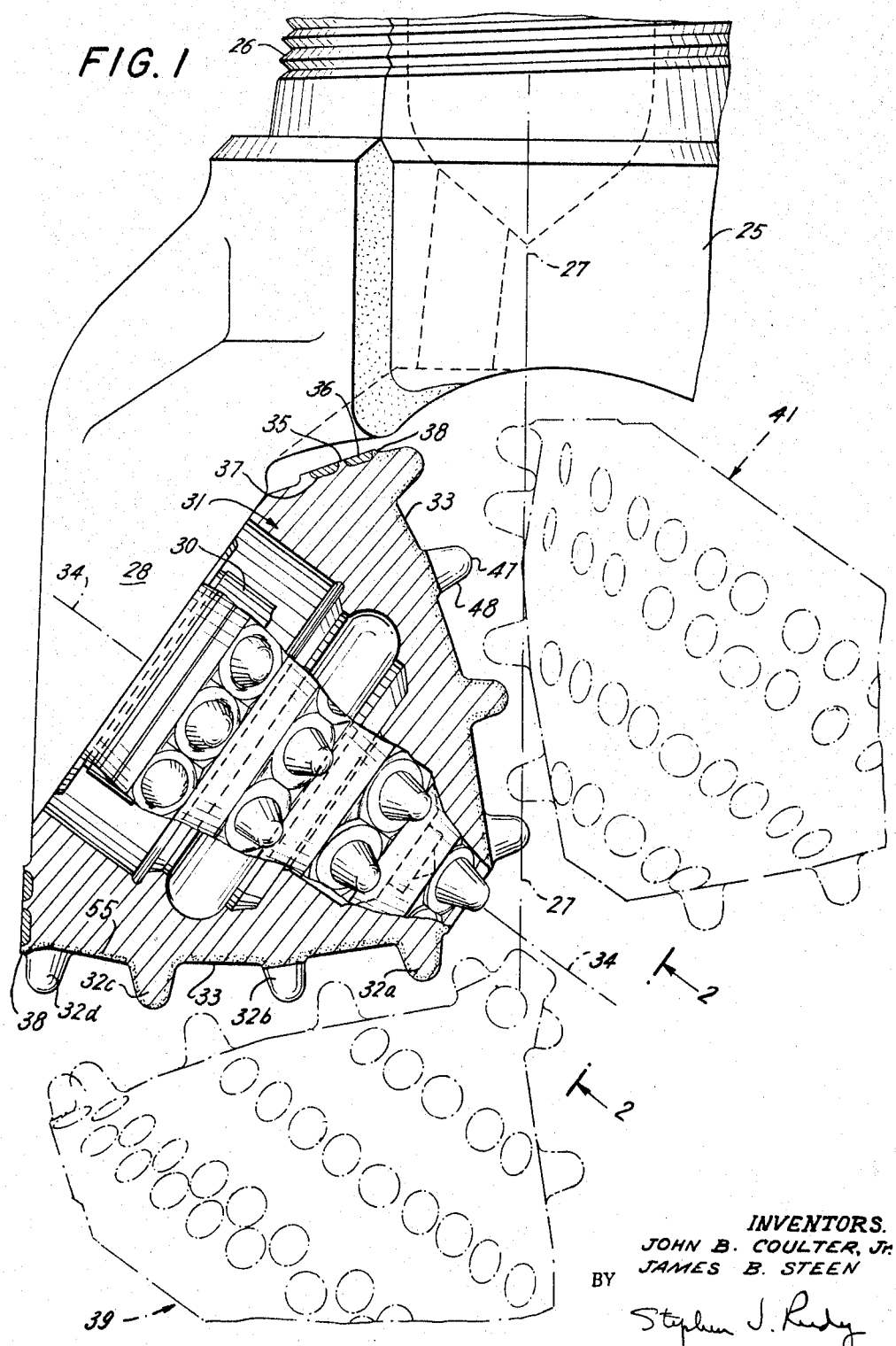

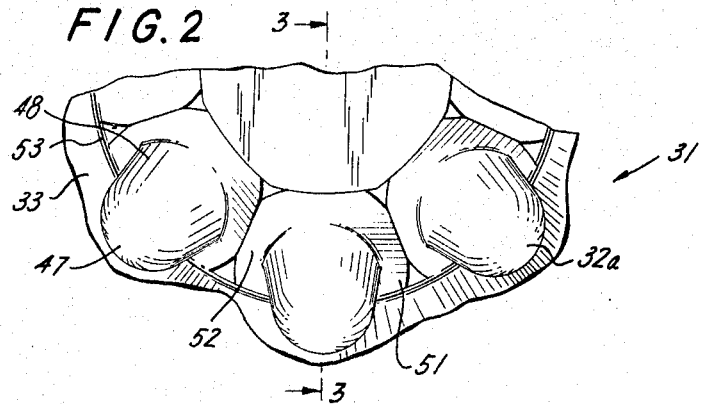
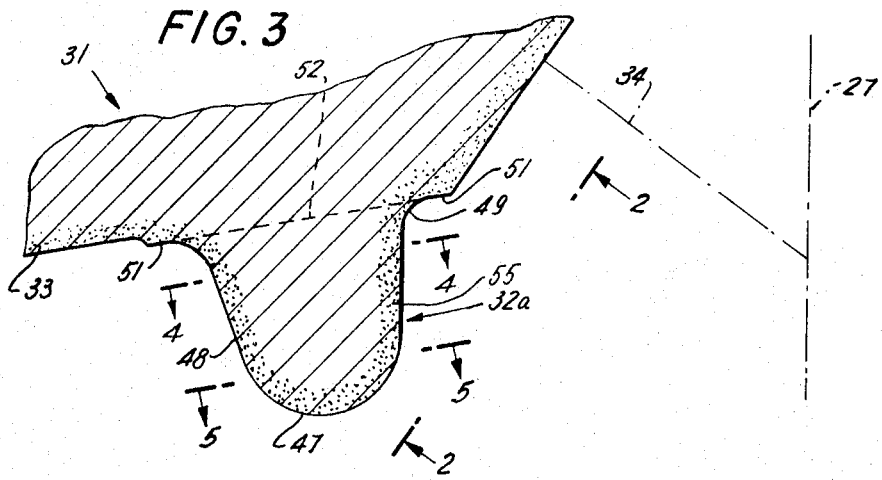
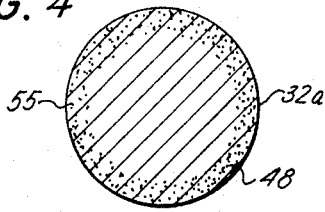
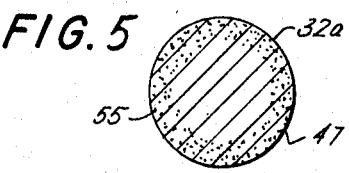

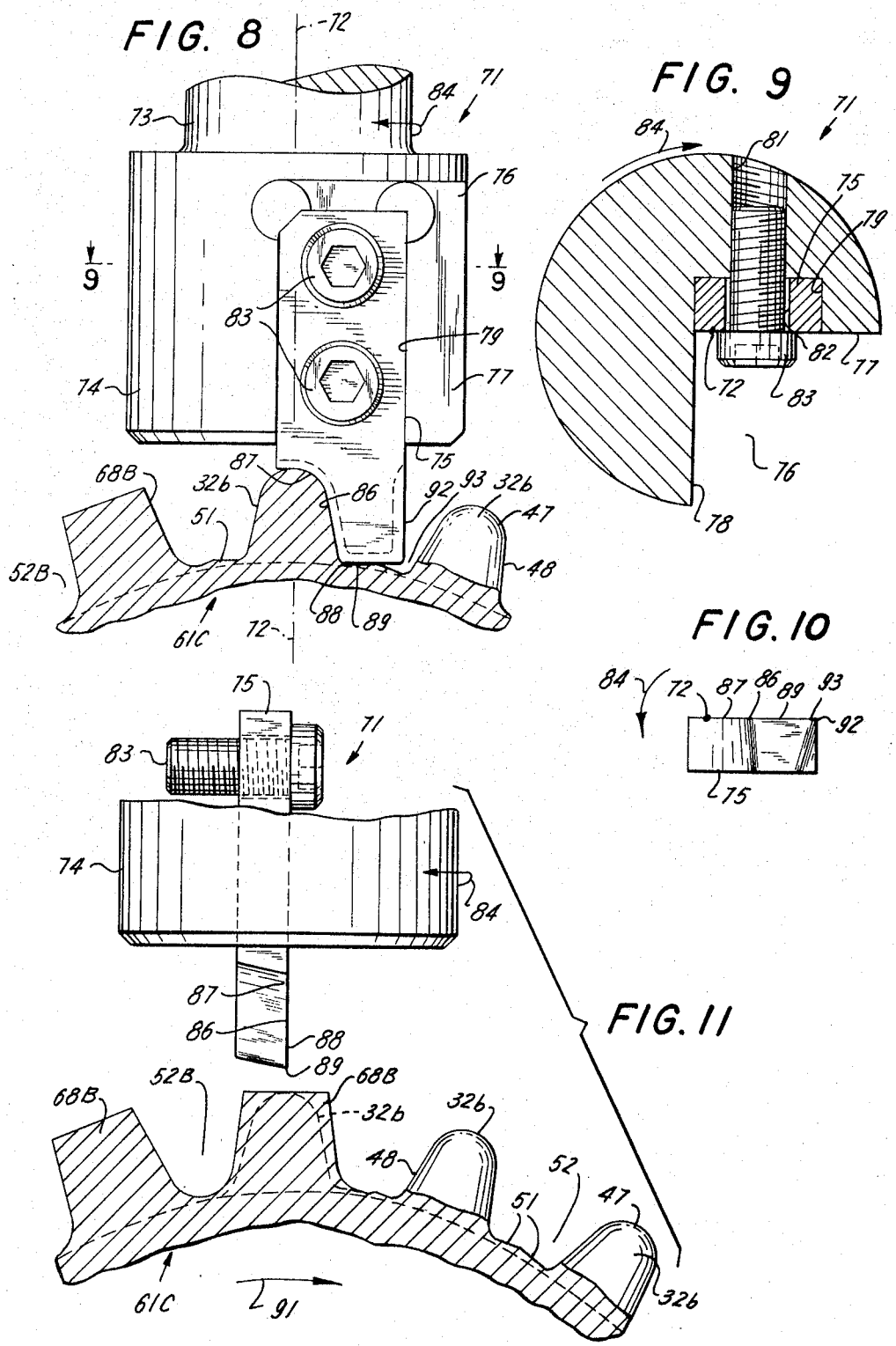

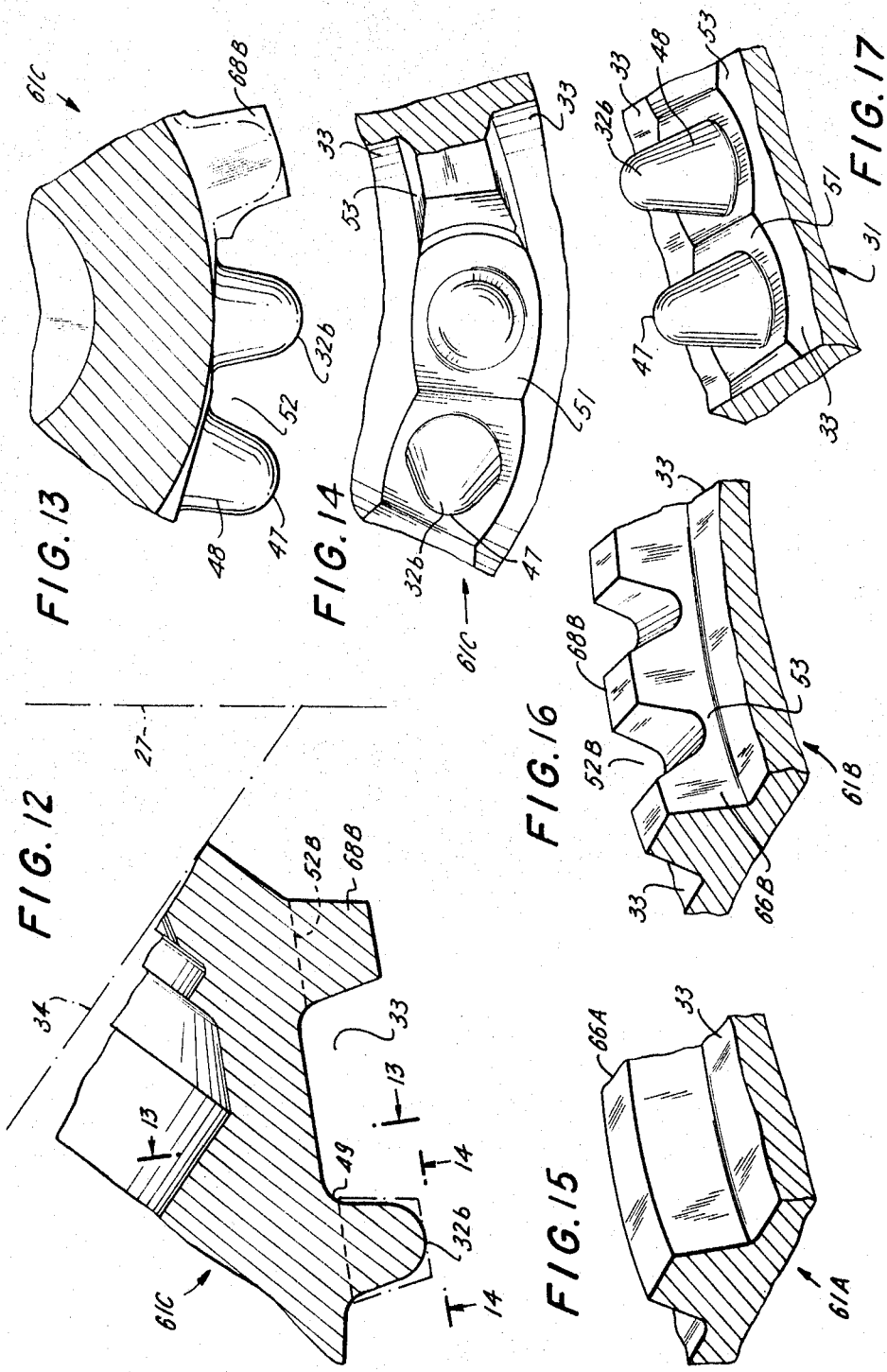

This application is a division of our co-pending parent application Serial Number 233,219, filed October 26, 1962, now Patent No. 3,223,188, issued December 14, 1965; and it is directed to a method of making a roller cone cutter.

The usual cone type rock bit comprises three conical cutters each having widely spaced circumferential rows of teeth offset in relation to the corresponding rows on the other cones to drill the formation at the bottom of the hole, the particles of detritus thus dislodged being removed by the action of a liquid flushing fluid or of pressurized air or gas. Cone bits in common use have various shapes of teeth.

In accordance with our parent application, a roller cone cutter is provided with circumferential rows of teeth wherein each tooth has a tip and a root portion and is circular in every plane of cross section not only in the tip but also in the root. More specifically, the root has the shape of a cone which is integral with the tip.

An object of this invention is the provision of an improved method of forming a roller cone cutter with teeth of this nature, which method is simpler and more economical and requires fewer manual operations than prior methods. The method of this invention includes the use of an end mill for individually forming each tooth, the mill being so designed and arranged that it completes the operation of shaping the tooth without necessitating a subsequent filing operation to remove sharp corners.

In the preferred method of manufacture, a cone workpiece or blank is machined by cutting circumferential grooves and radial grooves to leave circumferential rows of stubs of frusto-conical shape and these stubs are then cut down to a circular cross-section by the use of an end mill.

Still another object is to provide a method for forming such a roller cone cutter wherein the same end mill may be used for cutting teeth in different rows and in different sizes and shapes. In accordance with this invention, the cutting blade or forming tool is arranged as a detachable part of the end mill and may be quickly interchanged with another forming tool of modified shape.

Other objects and features of the invention will appear from the description which follows.

In the accompanying drawings which illustrate a preferred method of manufacturing a roller cone cutter:

FIG. 1 is a fragmentary view of a three cone rock bit showing in full line one of the cone cutters formed by the method of the present invention and depicted chiefly in longitudinal section, with a part of the cone and a part of the bit head in side elevation, and also showing in phantom lines the other two cones with their teeth in interfitting relation to those of the illustrated cone;

FIG. 2 is a fragmentary end view of the tip portion of the illustrated cone cutter looking in the direction of the axis of the cone cutter as indicated by the arrows 2 in FIG. 1 and in FIG. 3;

FIG. 3 is an enlarged longitudinal section of the tip portion of the cone cutter, taken on the line 3—3 of FIG. 2;

FIG. 4 is a cross section taken on the line 4—4 of FIG. 3 showing the circular root portion of one of the teeth of the cone cutter;

FIG. 5 is a cross section of the same tooth taken on the line 5—5 of FIG. 3 showing the circular tip portion;

FIG. 8 is an enlarged cross section of a fragmentary part of a row of teeth, the left side of the fragment being at the end of the second step in the process of manufacture with radial grooves formed therein, and the right side of the fragment being at the end of the third step of manufacture with the teeth milled to a circular cross sectional shape, the milling apparatus being shown at the completion of the third step of manufacture of one of the teeth;

FIG. 9 is a cross section of the milling apparatus taken along the line 9—9 of FIG. 8;

FIG. 10 is an elevational view of the inner end of the cutting blade or forming tool in the milling apparatus, the arrow representing the direction of rotation;

FIG. 11 is a view similar to FIG. 8 showing the milling apparatus removed from the cone blank and the latter indexed to a new position in which the milling tool registers with a tooth of quadrilateral cross section, said tooth being at the end of the second step of manufacture;

FIG. 12 is a fragmentary longitudinal section of a partly manufactured cone or workpiece showing the innermost row of teeth at the end of the second step of manufacture and another row of teeth some of which are at the end of the third step;

FIG. 13 is a fragmentary cross section along the line 13—13 of FIG. 12, the right side of the row being at the end of the second step and the center and left side of the row being at the end of the third step of manufacture;

FIG. 14 is a bottom view of the fragment shown in FIG. 13, looking upward as indicated by the arrows 14 in FIG. 12;

FIG. 15 is a perspective view of a portion of a row of teeth at the end of the first step of manufacture;

FIG. 16 is a perspective view of a portion of a row of teeth at the end of the second step of manufacture; and FIG. 17 is a perspective view of a portion of a row of teeth at the end of the third step in the manufacturing process.

Figure 6:
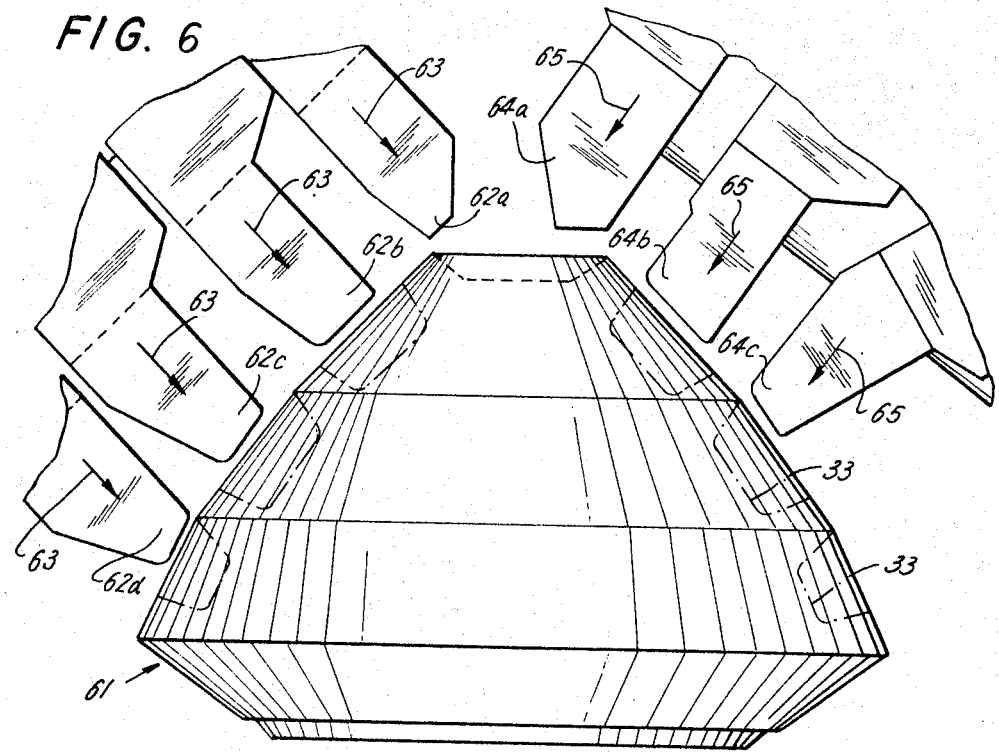
FIG. 6 is an elevational view of a cone cutter blank in association with the forming tool cutters, the arrows representing the direction of simultaneous movement of the forming tools toward the blank, and the phantom lines representing the metal which will be removed from the blank during the first step of the manufacturing process.
Figure 7:
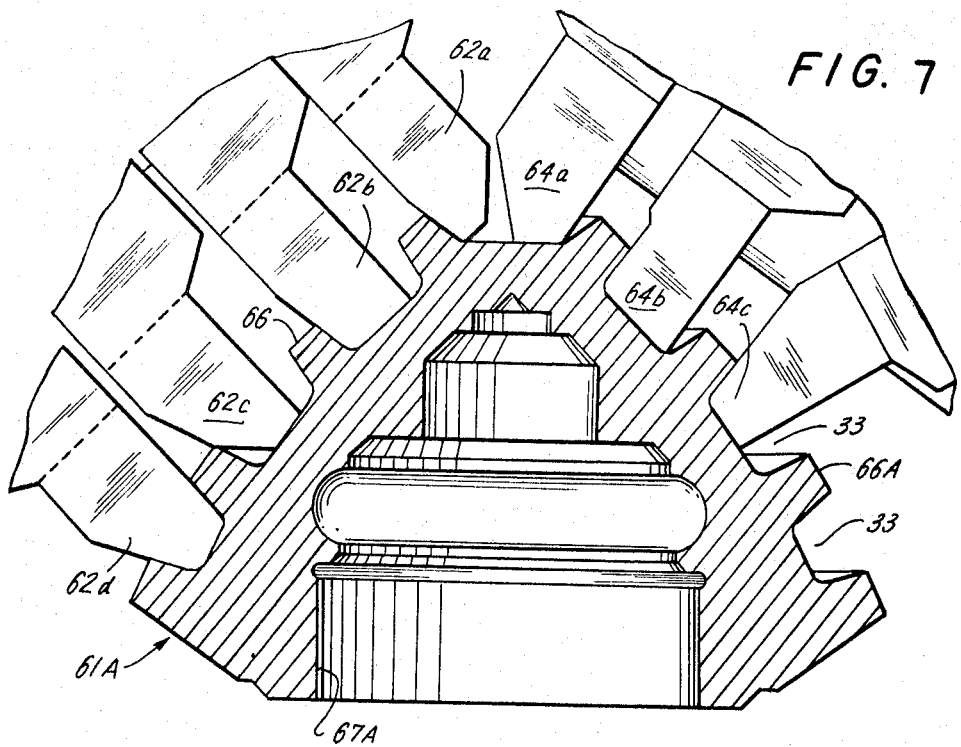
FIG. 7 is a longitudinal section of the cone cutter blank at the end of the first step of manufacture showing the forming tools in the position where they complete the cutting of the circumferential grooves.

FIGS. 1, 6 and 7 are drawn to the same scale; FIGS. 2 and 8–14 to a larger scale; and FIGS. 3–5 to a still larger scale.

Referring to FIG. 1, a bit head 25 of the usual form is shown having a threaded shank 26 for attachment to the lower end of a drill collar (not shown), whereby the bit head may be rotated about the vertical axis 27 of the bore hole. The bit head has the usual three equidistant legs 28 (one shown) extending downwardly and outwardly. Each leg 28 supports, near its lower end, a spindle 30 which extends downwardly and inwardly. The illustrated spindle provides a support for a cone cutter 31 manufactured in accordance with the method of the present invention. Suitable rolling and friction bearings (not shown) are interposed between the cone and the spindle according to the usual well known arrangement. The cutting surface of the cone 31 comprises a series of circumferentially extending rows of teeth 32a, 32b, 32c and 32d of novel formation, separated by wide and deep circumferential grooves 33.

The cone cutter 31 is suitably contoured and mounted to operate on the bottom of the bore hole with an approximately true rolling action. To this end, the spindle 30 is arranged with its axis 34 in the same vertical plane as the vertical axis 27 of revolution of the bit head, and the cone cutter 31 is positioned with its apex adjacent said vertical axis. The teeth 32 (*a, b, c* and *d*) are all approximately the same in size and shape.

The heel of the cone 31 is provided with a gage cutting surface 35 of frusto-conical shape, the lower portion of which rubs against the side wall of the bore hole. Preferably, the surface 35 is protected against wear by the usual rings of hard metal 36 deposited in two concentric grooves 37. The gage cutting surface 35 is separated from the heel row of teeth 32*d* by a smooth rim 38. The rim has a radius which is considerably shorter than that of the ground engaging crests of the adjacent teeth 32*d* and engages the earth formation at a higher level to ream the marginal area surrounding the area cut by the outermost teeth as the rim rolls over the marginal area with a crushing action. The cone 31 cooperates in a drilling operation with two mating cones 39 and 41, both shown in phantom lines.

In accordance with this invention, each of the teeth of the cutter 31, for example, has a novel shape designed to operate with a crushing action in hard formations and with a penetrating action in medium formations without sacrificing the advantage of a self-cleaning action obtained by means of an interfitting relation of the mating cones 39 and 41. Referring particularly to FIGS. 2–5, each tooth of the cutter 31 has a blunt tip 47 in the shape of a hemisphere and has a root 48 below the tip, the root having the shape of a frustum of a cone except at the base where it is connected to a rounded surface or fillet 49. The fillet has the shape of a sector of a torus and provides a smooth surface transition between the frusto-conical surface of the root and a flat base 51 which lies in a plane perpendicular to the axis of the conical root. The flat base, as shown in FIGS. 2, 3, 11, 14 and 17, extends around the root 48 adjacent the bottom of the circumferential groove or grooves 33 and at the bottom of the radial grooves 52 which separate the teeth in the same circumferential row. As will be described later, the flat bases 51 are formed by milling the annular lands 53 (FIGS. 2, 14, 17) which lie between the circumferential grooves 33 until the flat base 51 lies almost flush with the bottom of the circumferential groove leaving very little metal left in the annular lands outside of the teeth themselves. This arrangement is a departure from the usual practice of allowing the land to extend continuously around the cone cutter over a substantial radial depth measured from the bottoms of the teeth (or radial grooves) and the bottoms of the circumferential grooves.

The altitude of the root 48 is considerably greater than that of the tip 47, the latter being equal to the radius of curvature. The tooth is circular in every plane of cross section including the root portion 48 as shown in FIG. 4 and the tip portion 47 as shown in FIG. 5. In FIG. 3, the illustrated tooth 32*a* is delineated by a semi-circle (representing tip 47), two straight lines tangent to the semi-circle and diverging therefrom, and two arcs (representing the fillet 49) which are tangent to the base ends of the diverging lines and also to the perpendicular line (representing the flat base 51). The arrangement eliminates any sharp edges on the surface of the cone cutter and particularly on the teeth. As shown in FIG. 3, the sides of the root 48 taper at an acute angle, for example, with an included angle of twenty degrees (20°) so that the cross sectional area of the root changes only very gradually from one level to the next, whereas the cross section of the blunt tip 47 changes abruptly. This construction enables the teeth to penetrate more easily into the earth formation after they have progressed beyond the altitude of the tip 47. The axis of each tooth is inclined relative to the spindle axis 34 so that it extends approximately downward when in contact with the bottom of the hole as shown in FIGS. 1, 3 and 12.

In order to prolong the life of the teeth and the smooth rim 38, the surface of the cone 31 is carburized and heat treated, by means to be described later, to provide a case hardened skin 55 (FIGS. 1, 3, 4, 5). Such carburization is carried to a further degree and to a further depth of case as compared with standard practice. This is made possible by the unusual shape of the teeth which are devoid of sharp corners or weak areas which otherwise might be incompatible with a deep case.

The method of manufacturing the cone cutter 31, for example, will now be described, it being understood that the same method is employed for making the other cones 39 and 41 except that the teeth are spaced differently. Referring to FIG. 6, the original workpiece or cone blank 61 from which the cone cutter is made is a plain steel forging having a smooth external surface comprising numerous segments, some of which are plane surfaces and others of which are frusto-conical. The workpiece is supported on a lathe spindle (not shown) for rotation about the axis of the frusto-conical surface portions. A set of sharp forming tools 62 (*a, b, c, d*) are arranged on the left side of the workpiece and are supported for simultaneous movement downward and inward in the direction of the arrows 63, said arrows being parallel to each other. The forming tools have cutting edges at the bottom and/or sides. A second set of sharp forming tools 64 (*a, b, c*) are arranged on the right side of the workpiece 61 and are supported for simultaneous movement downward and inward in the direction of the arrows 65, said arrows being parallel to each other. The workpiece 61 is rotated on its axis while each of the forming tools is gradually fed toward said axis, either one set at a time or preferably both sets simultaneously. The forming tools engage the surfaces of the workpiece along spaced annular areas and remove metal therefrom by a machining operation. The cutting edges of the two sets of forming tools are so constructed and arranged that collectively they delineate the shape of the side walls and bottoms of the circumferential grooves 33.

FIG. 7 shows the workpiece 61A at the end of the first step in the manufacturing process with the circumferential grooves 33 separated by circumferential ridges 66A. FIG. 7 also shows the workpiece provided with a bore 67A but it will be understood that the machining of the bore is not a part of the present invention and may be effected either prior to, or subsequent to, the machining of the grooves 33 and teeth 32 on the surface of the workpiece.

At the end of the first step of manufacture, each circumferential ridge 66A has substantially the shape of a trapezoid of revolution as shown in FIGS. 7 and 15. The next step is to break up the ridge by forming radial grooves 52B extending transversely to the circumferential grooves 33. In the second step, these radial grooves are formed by a milling machine (not shown) or by using a shaper having a cutting tool arranged to reciprocate along a line which is co-planar with the cone axis 34 but extending oblique thereto. During this second step, the workpiece is arranged for indexing movement about the axis 34 upon completion of each individual radial groove 52B. The radial grooves are uniformly spaced circumferentially of each ridge and the indexing angle is determined by the number of teeth in the particular row. At the end of the second step in the process of manufacture, the workpiece 61B has a notched, or radially grooved ridge 66B. As shown in FIG. 16, ridge 66B includes the annular land 53 previously described, and also a series of stubs 68B between the radial grooves 52B. The latter have the shape of a V, diverging from a concave bottom, with the result that the intervening stubs 68B have the shape of a frustum of a pyramid.

In the third step of manufacture, the stubs 67B are individually milled to form the teeth 32 (*a, b, c* or *d*). For purposes of illustration, the workpiece 61C is illustrated in FIGS. 8, 11, 12, 13 and 14 with the third step only partly completed, that is, with some, but not all, of the teeth milled to the final shape. The milling apparatus for individually shaping the teeth 32 is shown in FIGS. 8–11. It comprises an end mill 71 supported for rotation about an axis 72 which extends radially of the workpiece 61C and through the center of a selected one of the stubs 68B. The end mill is also arranged to reciprocate along the axis 72 toward and away from the workpiece. The axis 72 lies in the same plane as the cone axis 34 and at such an angle thereto that the teeth 32 will extend approximately vertically downward when in contact with the bottom of the bore hole as illustrated in FIG. 1. The end mill has a shaft 73 integrally connected to a head 74, the latter serving as a holder for a form tool 75. Near its top the mill head 74 has the cross sectional shape of a solid circle concentric to the shaft 73 and axis 72; but below the top portion the head is cut away to form a sector shaped recess 76 extending for more than 90° of the circumference of the head, but defined by vertical walls 77 and 78 which are at right angles to each other. One of these walls 77 extends radially and lies in the same plane as the axis of rotation 72 while the other wall 78 lies in a plane which is parallel to the head axis. The radial wall 77 is recessed to provide a vertical groove 79 of rectangular cross section, the inner end of which forms a continuation of wall 78. The form tool is detachably mounted in the groove 79 and has the same cross section as the groove throughout the major portion of the length of the tool so that the front face of tool 75 lies flush with the ungrooved portion of radial wall 77. The form tool 75 is insertable into and removable from the holder 74 through the lower end of the groove 79. In order to secure the form tool rigidly in the holder 74, the latter is provided with a pair of threaded openings 81 extending transverse to the groove 79, and the form tool is provided with a pair of holes 82 registering with the threaded openings. A pair of socket head cap screws 83 extend loosely through the holes 82 and into threaded engagement with the openings 81. The heads of the cap screws seat against the front face of the form tool 75 which is the leading face when the end mill is rotated in the direction of the arrow 84.

Referring to FIG. 8, the lower inner corner of the front face of the form tool 75 has a cutting edge which conforms in contour with a half longitudinal section of the tooth 32a. Accordingly, the cutting edge comprises a straight portion 86 tapering upward at an agle of 10° relative to the axis of rotation 72, the straight portion being tangent to a curved portion 87. The radius of curvature of the latter conforms with that of the hemispherical tip 47 and is equal to the altitude of the tip of the tooth 32a. At the lower end of the straight portion 86, the cutting edge has a chamfer portion 88 conforming in radius with the fillet 49 shown in FIG. 3. Extending tangentially from the chamfer 88 and along the bottom edge of the front face of the form tool 75, the cutting edge has a straight portion 89 arranged to mill the plane surface 51 which surrounds the base of the tooth 32b as shown in FIG. 17.

In the operation of the end mill 71, the mill is aligned with one of the stubs 68B, as previously described, and as illustrated in FIG. 11. With the workpiece 61C held stationary, the end mill simultaneously rotates in the direction of the arrow 84 and advances along its axis 72 in the direction of the workpiece. Initial contact between the form tool 75 and the workpiece occurs when the chamfer portion 88 of the cutting edge engages the upper edges of the stub 68B. Thereupon, the edges of the stub are milled away to reduce the cross section gradually from a quadrilateral to a circle, starting at the top of the stub and progressing downward until the parts attain the position shown in FIG. 8 when all of the cutting edge portions 86, 87, 88, 89 are engaged with the workpiece and the tooth 32b is completely formed with a circular cross section in every plane as previously described. The end mill 71 is then withdrawn along its axis 72 back to the position of FIG. 11 and is held out of contact with the workpiece 61C for a sufficient interval of time to permit repositioning of the latter.

The workpiece 61C is then indexed by rotating it about its axis 34 in the direction of the arrow 91 until the next stub 68B is aligned with the end mill and the operation is repeated. Preferably, the end mill 71 rotates continuously during the formation of an entire circumferential row of teeth and the reciprocating movements of the mill and the indexing motions of the workpiece are controlled automatically. Automatic machine tools adapted to impart intermittent indexing movements to a rock bit cone, and to reciprocate a tool toward and away from the cone surface, are well known in the art, as exemplified by Evans Patent 1,922,424 granted August 15, 1933. After an entire row of teeth has been completed, the workpiece 61C is removed from the spindle (not shown) on which it is supported and indexed and is replaced by a succeeding workpiece. The latter usually conforms with the one it replaced in all respects and, therefore, is intended to be used as a corresponding cone to be assembled in a different bit head 25. The use of a single end mill for forming a single row of teeth on a single one of the three cones of any head has the advantage of saving time as the cone workpieces are replaced in rapid succession without requiring any adjustment of the position of the end mill.

In some instances, the end mills are used for producing only a relatively small quantity of rock bits of a particular size. In that case, it is not economical to employ a separate end mill for each row of teeth on all three cones. In order to adapt the same end mill 71 for cutting a different row on the same cone, or a row on another cone, the end mill axis 72 is repositioned relative to the cutter axis 34 so that the teeth will have the location and angularity shown in FIG. 1. The indexing angle for the workpiece is also adjusted correspondingly, it being understood that the teeth in any one row are uniformly spaced and therefore the indexing angle is equal to 360° divided by the number of teeth in the row. In case the end mill 71 is shifted to a row of stubs intended to be shaped as teeth of a different size from the teeth previously milled, the form tool 75 is removed from the holder 74 and replaced by another form tool of the desired size and shape. The socket head cap screws 83 permit ready removal and replacement of the form tools.

Preferably, the straight radial portion 89 of the cutting edge is extended along the entire length of the bottom edge of the front face of the form tool 75 and a vertical cutting edge 92 is provided along the lower right side of the front face of the form tool 75, the vertical edge being connected to the bottom edge portion 89 by means of a chamfer 93. In the use of the method illustrated in FIGS. 8 and 11, no function is performed by the vertical edge 92, chamber 93 or the outer half of the bottom edge 89. However, these edges may be used in a modified process in which the second step is eliminated, that is, for milling the teeth 32b in a row such as shown in FIG. 15 without the step of cutting the groove 52B shown in FIG. 16. The structure resulting from the elimination of the second step is substantially the same as that of the completed cone 31 inasmuch as the added cutting edges 92, 93 and part of 89 perform (by a milling operation) the function of the tool used for cutting the radial grooves 52B in the method first described. In commercial production, it has been found preferable to utilize the second step as illustrated in FIG. 16 because the elimination of this step would cause excessive wear on the form tools 75 and also require a longer interval of time for the latter to remove a large quantity of metal around the tooth 32b.

After the machining operations on the cone 31 (39 or 41) have been completed, the steel cone is carburized to produce a case or skin 55 for a depth of .105″ or .110″. For this purpose, the cone is heated to a temperature of 1750° F. in a suitable atmosphere such as gaseous hydrocarbon or carbon monoxide and for such period of time until the carbon content of the steel is raised to about 0.85% at the surface and to about 0.80% at a depth of .04". After the desired carbon concentration is obtained in the skin 55, the cone 31 is quenched in oil at a temperature of 1650° F. The cone is then reheated to a temperature of 1450° F. in a second furnace which is arranged with two compartments through which the cone passes. In the first compartment, the carbon content of the case 55 is reduced so that the percentage of carbon is .80% at a depth of only .010". Later in the second compartment, the carbon content of the case is increased to 0.88% at a depth of .010". After leaving the second furnace, the cone is permitted to cool slowly. This process of carburizing results in a considerable number of very small spheroidized carbides from the cone surface to a depth of about .010" with a consequent highly wear resistant surface. The total depth of case, namely .105" or .110" is beyond the limit usually considered safe for conventional cones. Due to the shape of the teeth 32b, which are free from any sharp corners and which avoid any concentration of stresses, the hard case 55 does not result in any fracture, breakage or chipping of the teeth.

What is claimed is:

1. The method of making a roller cutter for an earth boring drill which comprises: rotating a steel workpiece about its axis while moving a set of forming tools toward and through the surface of the workpiece to cut away a series of circumferential grooves, thus leaving a series of circumferential ridges on the surface of the workpiece; positioning a selected one of the ridges in alignment with the axis of an end mill; and rotating the end mill and simultaneously moving it toward the selected ridge to mill away two transverse recesses in the ridge, with the axis of the end mill located between the two recesses; and continuing the rotating and axial movement of the end mill until the portion of the ridge between the recesses is converted into a tooth having a circular cross section.

2. The method of making a roller cutter cone for an earth boring drill which comprises: the first step of rotating a steel workpiece about its axis while moving a set of forming tools toward and through the surface of the workpiece to cut away a series of circumferential grooves leaving a series of circumferential ridges on the surface of the workpiece; the second step of cutting radial grooves in the ridges thus reducing the latter to a row of stubs separated by the radial grooves; arranging a selected one of the stubs in alignment with the axis of an end mill; and the third step of simultaneously rotating the end mill and moving it into engagement with the selected stub to mill away the edges of the stub, and of continuing the rotating and axial movement of the end mill until the stub is converted into a tooth with at least the root portion thereof shaped to a circular cross section.

3. The method of making a roller cutter cone according to claim 2, in which the first step includes the use of two separate sets of forming tools converging simultaneously toward the workpiece axis from different directions, the forming tools having cutting edges shaped to form the bottom and sides of the circumferential grooves with the latter diverging outward, thereby forming ridges in the shape of a trapezoid of revolution; and in which the radial grooves cut during the second step are arranged with their flanks diverging outward thereby resulting in stubs having the shape of a frustum of a pyramid; and in which the third step includes the cutting of the corners of the stubs and gradually enlarging the contact area between the mill and the stub until it extends completely around the circumference of the stub.

4. The method of making a roller cutter cone according to claim 2, in which the completion of the third step is followed by the return movement of the end mill away from the workpiece, and which includes the fourth step of indexing the workpiece through an angle corresponding to the angular distance between stubs, the end mill being retained out of contact with the workpiece during the indexing movement; and which method includes the repetition of the third step to convert the succeeding stub in the same row into a tooth of circular cross section.

5. The method of making a roller cutter cone according to claim 2, which includes the use of a form tool in the end mill having a side edge of a contour conforming to the longitudinal section of the completed tooth and also having a bottom edge extending transversely to the axis of rotation of the end mill, and which method includes the additional step of engaging said bottom edge with the surface of the workpiece surrounding the stub to form a flat base extending radially outwardly of the completed tooth.

6. The method of making a roller cutter cone for an earth boring drill which comprises: rotating a steel workpiece about its axis while cutting out a series of circumferential grooves leaving a series of circumferential ridges on the surface of the workpiece; cutting radial grooves in the ridges thus reducing the latter to a row of stubs separated by the radial grooves, each stub having sharp edges and corners; arranging a selected one of the stubs in alignment with the axis of an end mill; simultaneously rotating the end mill and moving it into engagement with the selected stub to mill away the sharp corners and edges of the stub; continuing the rotating and axial movement of the end mill until the stub is converted into a tooth having the shape of a circle in every plane of cross section; and continuing and repeating the operation of the end mill until all teeth are rounded and all cutter cone surfaces connecting the teeth are rounded, the entire toothed surface of the roller cone being devoid of sharp edges or corners.

7. The method of making a roller cutter cone according to claim 6, which comprises the further step of heating and carburizing the toothed surface portion of the cutter cone, quenching the cone, then reheating said surface portion while first reducing and then increasing the carbon content thereof; then cooling said surface portion slowly to form a hard case with a surface highly resistant to wear and abrasion.

No references cited.

GRANVILLE Y. CUSTER, Jr., *Primary Examiner.*